(12) United States Patent
Kobayashi et al.

(10) Patent No.: US 8,947,795 B2
(45) Date of Patent: Feb. 3, 2015

(54) PLASTIC OPTICAL ELEMENT AND METHOD OF MANUFACTURING THE SAME

(71) Applicant: Canon Kabushiki Kaisha, Tokyo (JP)

(72) Inventors: Daigo Kobayashi, Tokyo (JP); Wataru Kikuchi, Warabi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/898,316

(22) Filed: May 20, 2013

(65) Prior Publication Data

US 2013/0314798 A1    Nov. 28, 2013

(30) Foreign Application Priority Data

May 23, 2012    (JP) ................................. 2012-117750

(51) Int. Cl.
*G02B 7/02*    (2006.01)
*G02B 3/00*    (2006.01)
*B29D 11/00*    (2006.01)
*B29C 45/16*   (2006.01)

(52) U.S. Cl.
CPC ............ *G02B 3/00* (2013.01); *B29D 11/00009* (2013.01); *B29D 11/0073* (2013.01); *B29C 45/16* (2013.01)
USPC .............. 359/811; 359/642; 264/1.1; 264/1.7

(58) Field of Classification Search
CPC .... G02B 7/02; G02B 7/028; B29D 11/00009; B29D 11/00403; B29D 11/0073; B29C 45/15; B29C 45/16

USPC .............. 264/1.1, 1.7, 259; 359/811, 738, 796
See application file for complete search history.

(56) References Cited

U.S. PATENT DOCUMENTS

| 4,785,053 A | 11/1988 | Ito et al. |
| 6,327,415 B1 | 12/2001 | Koyano et al. |
| 2007/0160831 A1 | 7/2007 | Hsieh et al. |
| 2008/0100921 A1 | 5/2008 | Nishikawa et al. |

FOREIGN PATENT DOCUMENTS

| DE | 102008034153 A1 | 1/2010 |
| EP | 2402140 A1 | 1/2012 |
| EP | 2 666 619 A1 * | 11/2013 |
| JP | S57-72822 A | 5/1982 |
| JP | S60-054822 A | 3/1985 |

(Continued)

OTHER PUBLICATIONS

NPL English-Language translation of Japanese Patent Publication JP H08-187793 A (obtained from http://www.ipdl.inpit.go.jp/homepg_e.ipd on Apr. 22, 2014).*

(Continued)

*Primary Examiner* — David N Spector
(74) *Attorney, Agent, or Firm* — Canon USA Inc. IP Division (57) ABSTRACT

A plastic optical element includes a member and covering portions formed on a first surface and a second surface of the member. A projecting portion made of a material out of which the member is made and a material out of which the covering portions are made is formed on a part of a side surface of the member, and the covering portion of the first surface and the covering portion of the second surface are connected to each other through the projecting portion.

8 Claims, 8 Drawing Sheets

(56) References Cited

FOREIGN PATENT DOCUMENTS

| | | |
|---|---|---|
| JP | 60-097301 A | 5/1985 |
| JP | 63-315216 A | 12/1988 |
| JP | H04-185105 A | 7/1992 |
| JP | H06-335939 A | 12/1994 |
| JP | 8-187793 A | 7/1996 |
| JP | H08-190004 A | 7/1996 |
| WO | WO 2012/070456 A1 * | 5/2012 |

OTHER PUBLICATIONS

NPL International Search Report (PCT/ISA/210) prepared for PCT/JP2011/076470 (May 2013).*
NPL Written Opinion of the International Searching Authority (PCT/ISA/237) prepared for PCT/JP2011/076470 (May 2013).*
U.S. Appl. No. 13/898,274, filed May 20, 2013, Wataru Kikuchi.
U.S. Appl. No. 13/988,500, filed May 20, 2013, Daigo Kobayashi.

* cited by examiner

PLASTIC OPTICAL ELEMENT AND METHOD OF MANUFACTURING THE SAME

BACKGROUND OF THE INVENTION

1. Field of the Invention

The present invention relates to a method of manufacturing plastic optical elements that are to be used in optical apparatuses such as a digital camera and a copying machine.

2. Description of the Related Art

There has been a growing demand for manufacturing of a thick optical element by injection molding. However, as the thickness of an optical element increases, a stress increases due to a difference between the degree of shrinkage on curing of a plastic surface layer that hardens first and the degree of shrinkage on curing of a plastic inner portion that hardens subsequently while the optical element is being molded. Thus, there have been problems of vacuum bubbles (voids) generated within the optical element and a residual internal stress within the optical element. In addition, since the time required to cool such a thick optical element in a metal mold becomes very long as the thickness of the optical element increases, there has been a problem in that the length of a molding cycle significantly increases. As a measure to address these problems, Japanese Patent Laid-Open No. 63-315216 discloses a method of manufacturing a plastic optical element, the method including arranging a premolded plastic member in a metal mold and covering the member with a molten plastic so that the member becomes integrated with the molten plastic by simultaneously injecting the molten plastic onto front and rear surfaces of the member.

In Japanese Patent Laid-Open No. 63-315216, in order to prevent the member from being displaced by a resin pressure exerted by a covering resin, member holding portions are formed on the outer peripheral surface of the member, and the member holding portions are brought into contact with the metal mold so as to directly hold the member. However, in this method, a bending stress is generated in the member holding portions due to a difference between internal pressures of molded resins simultaneously injected onto the front and rear surfaces of the member. There have been problems in that the stress causes deformation of the member, and the birefringence of the member increases. As a result, the optical performance of a thick lens formed of the member covered with the resin is reduced, and in some cases, cracks occur in the member holding portions.

SUMMARY OF THE INVENTION

The present invention has been made to solve the above problems, and the present invention provides a plastic optical element that has good optical characteristics and in which deformation is less likely to occur even if the plastic optical element is thick, and provides a method of manufacturing the plastic optical element.

The present invention provides a plastic optical element that includes a member including a first surface, a second surface opposite the first surface, and a side surface connecting the first surface and the second surface, a first covering portion that covers the first surface, and a second covering portion that is made of a material the same as a material out of which the first covering portion is made, the second covering portion covering the second surface. A protruding portion that is made of a material the same as a material out of which the member is made and a connecting portion that is made of a material the same as the material out of which the first covering portion is made and that is formed adjacent to the protruding portion, the connecting portion connecting the first covering portion and the second covering portion to each other, are formed on a part of the side surface of the member. The protruding portion and the connecting portion are integrated with each other so as to form a projecting portion.

The present invention provides a method of manufacturing a plastic optical element, the method including arranging a member that includes a first surface, a second surface opposite the first surface, and a side surface connecting the first surface and the second surface in a metal mold and molding a covering portion on the first surface and the second surface. The member includes a protruding portion on a part of the side surface of the member, and spaces adjacent to the first surface, the second surface, and the protruding portion are formed in the metal mold while the protruding portion is brought into contact with the metal mold. A plastic is injected into the spaces so that the covering portion of the first surface and the covering portion of the second surface are formed and connected to each other.

Further features of the present invention will become apparent from the following description of exemplary embodiments with reference to the attached drawings.

DESCRIPTION OF THE EMBODIMENTS

First Embodiment

A plastic optical element according to a first embodiment of the present invention will be described below.

The plastic optical element according to the first embodiment includes a member and covering portions formed on a first surface and a second surface of the member. The member includes a projecting portion made of a material out of which the member is made and a material out of which the covering portions are made on a part of the side surface of the member, and the covering portion of the first surface and the covering portion of the second surface are connected to each other through the projecting portion. A transparent member that is to be a core of the plastic optical element (a lens) after the covering portions are formed on the surfaces thereof will be referred to herein as a member. In other words, a member that is a center core (a core) of the plastic optical element (a lens)

will be referred to herein as a member. The member may be a lens. The surfaces of the plastic optical element, which has been formed, may be additionally covered with a plastic. The plastic out of which the plastic optical element is made may be transparent. The term "transparent" denotes not only a state of being colorless and transparent but also a state of being colored and transparent, and the visible light transmittance may be at least 80% or more.

Figure 1A:
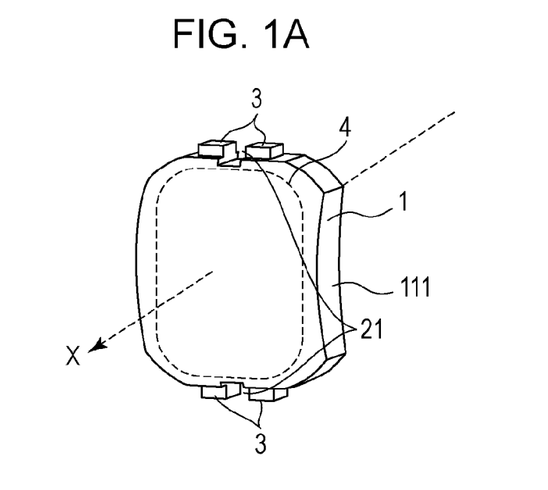
FIGS. 1A to 1C are diagrams illustrating a member according to a first embodiment and Example 1 of the present invention.
Figure 1B:
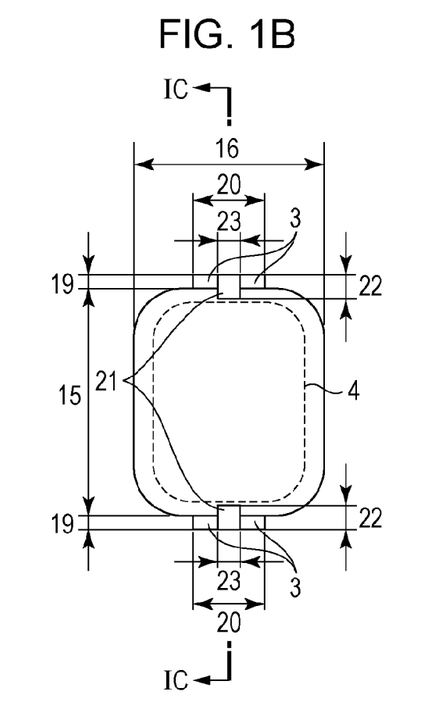
Figure 1C:
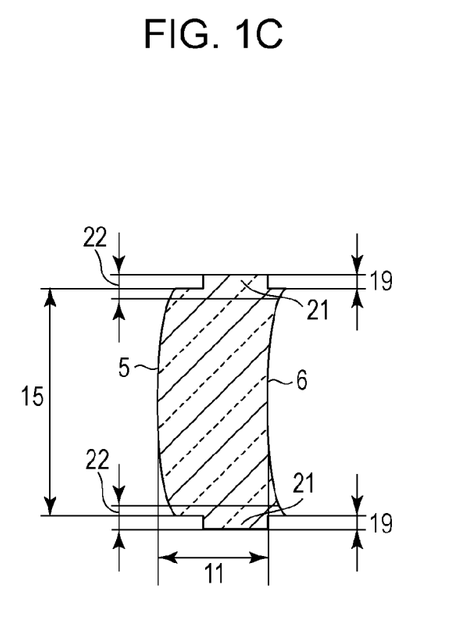

The above configuration is illustrated in FIGS. 1A to 1C, FIGS. 2A to 2C, and FIGS. 3A to 3D. FIG. 1A, FIG. 1B, and FIG. 1C are a perspective view, a plan view, and a sectional view of the member according to the first embodiment of the present invention, respectively. FIGS. 1A to 1C illustrate a member 1, a side surface 111 of the member, protruding portions 3 of the member protruding from parts of the side surface of the member, an optically effective area 4, a first surface 5 of the member, a second surface 6 of the member opposite the first surface 5, a thickness 11 of the member, a height 15 of the member, a width 16 of the member, a height 19 of the protruding portions of the member, a width 20 of the protruding portions of the member, connecting areas 21, a height 22 of the connecting areas, a width 23 of the connecting areas, and an optical axis X.

Figure 2A:
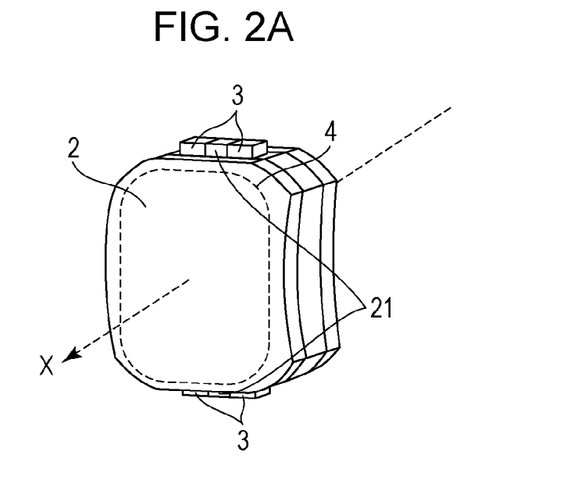
FIGS. 2A to 2C are diagrams illustrating a plastic optical element according to the first embodiment and Example 1 of the present invention.
Figure 2B:
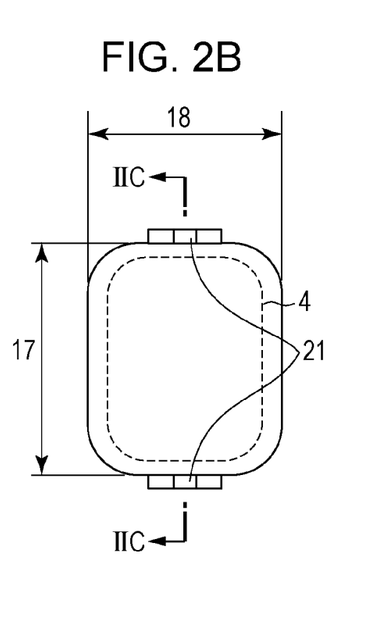
Figure 2C:
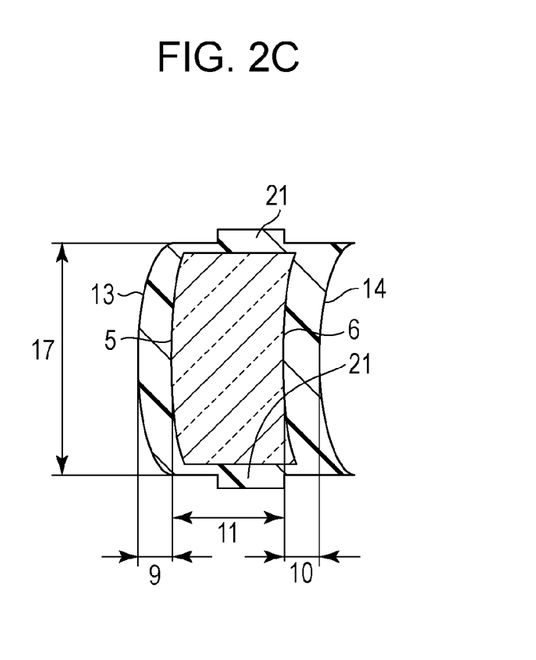

FIG. 2A, FIG. 2B, FIG. 2C are a perspective view, a plan view, and a sectional view of the plastic optical element according to the first embodiment, respectively. The same elements as in FIGS. 1A to 1C are denoted by the same reference numerals, and repeated description thereof will be omitted. FIGS. 2A to 2C illustrate a plastic optical element 2, a thickness 9 of a first covering portion made of a covering plastic and formed on the first surface of the member, a thickness 10 of a second covering portion made of the covering plastic and formed on the second surface of the member, a first optical surface 13 of the plastic optical element, a second optical surface 14 of the plastic optical element, a height 17 of the plastic optical element, and a width 18 of the plastic optical element. The covering plastic is also injected into the connecting areas 21, thereby forming connecting portions. Each of the connecting portions is integrated with a corresponding one of the protruding portions 3 of the member, thereby forming the projecting portion made of the material out of which the member is made and the material out of which the covering portions are made.

In the case where the first covering portion and the second covering portion that respectively cover the first surface and the second surface of the member are molded while the protruding portions protruding from the side surface of the member are brought into contact with a metal mold so as to be held by the metal mold, a stress is applied to the protruding portions when the covering portions are molded. As a result, the birefringence of the member increases, and in some cases, cracks occur in the protruding portions of the member. During the period from a dwelling step to a cooling step, a difference occurs between the resin pressures inside the first covering portion and the second covering portion, and a pressure that acts from one of the covering portions having a larger resin pressure toward the other covering portion having a smaller resin pressure is generated. This pressure causes the stress.

Each of the connecting areas 21 is formed in the corresponding protruding portion 3 of the member illustrated in FIGS. 1A and 1B. The first covering portion and the second covering portion are connected to each other with a covering resin in each of the connecting areas 21 when the plastic optical element is molded. Even if a difference occurs between the resin pressures inside the first covering portion and the second covering portion, the resin pressures can be transferred between the covering portions via the connecting area 21. Therefore, forming such an area has an advantageous effect of reducing the stress generated in the protruding portions. The connecting portions formed in the connecting areas 21 are integrated with the corresponding protruding portions 3 of the member, thereby forming the projecting portions made of the material out of which the member 1 is made and the material out of which the covering portions are made. Consequently, the strength of the projecting portions may be enhanced, and as a result, the plastic optical element 2 that includes the projecting portions in which cracks do not occur and the birefringence of which is reduced can be provided.

Figure 4A:
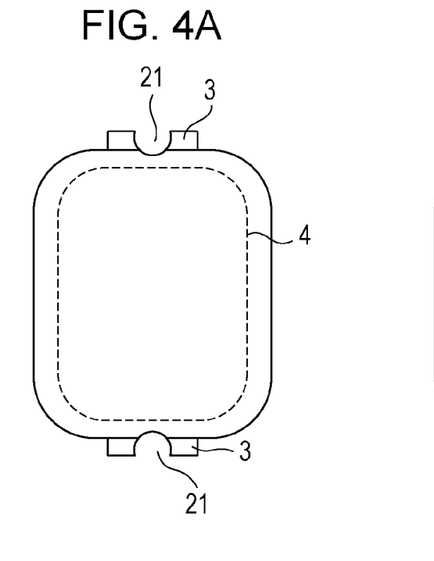
FIGS. 4A to 4D are diagrams illustrating modifications of the member according to the first embodiment of the present invention.
Figure 4B:
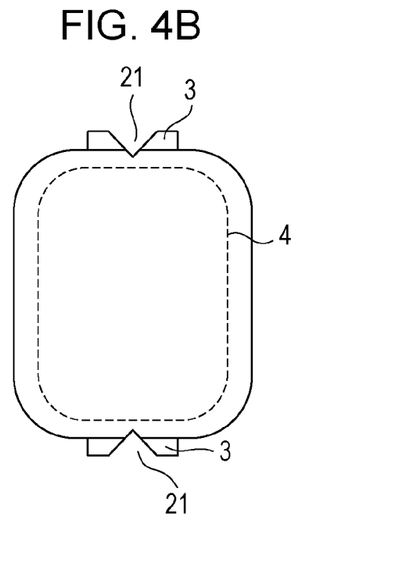
Figure 4C:
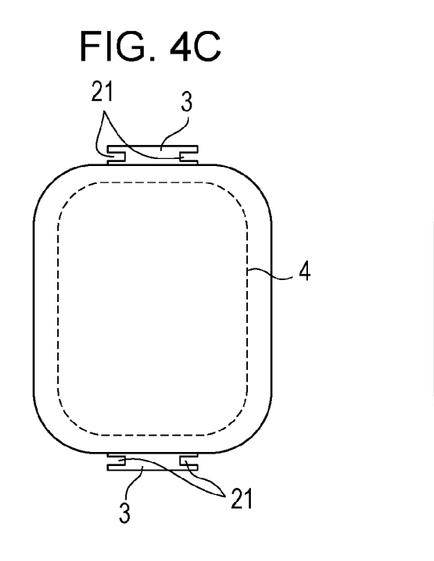
Figure 4D:
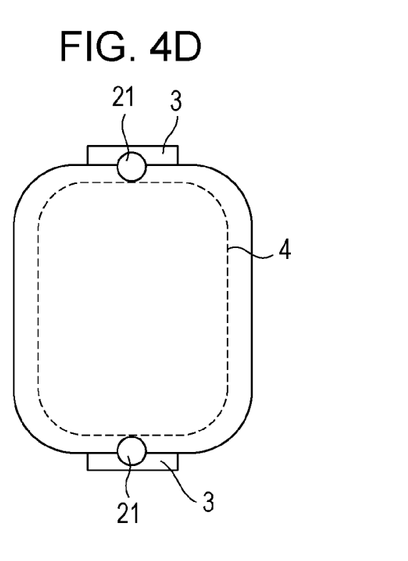

As an example, each of the connecting areas 21 illustrated in FIGS. 1A to 1C has a rectangular shape formed by cutting away the corresponding protruding portion 3 when viewed from a direction parallel to the optical axis X. However, the shape of the connecting area 21 is not limited to such a shape. FIGS. 4A to 4D illustrate other shapes of the connecting area formed in the protruding portion of the member. FIGS. 4A to 4D are plan views of modifications of the connecting area formed in the corresponding protruding portion of the member according to the first embodiment. The same elements as in FIGS. 1A to 1C and FIGS. 2A to 2C are denoted by the same reference numerals, and repeated descriptions thereof will be omitted. Each of the connecting areas 21 has a semicircular shape when viewed from the direction parallel to the optical axis X in FIG. 4A, and each of the connecting areas 21 has a triangular shape when viewed from the direction parallel to the optical axis X in FIG. 4B. In FIG. 4C, the connecting area 21 has a rectangular shape when viewed from the direction parallel to the optical axis X and is formed at two positions in each of the protruding portions 3. Each of the connecting areas 21 has a circular shape when viewed from the direction parallel to the optical axis X in FIG. 4D. A resin is injected into the connecting areas 21 having any one of the shapes when the plastic optical element is molded, thereby forming connecting portions. Even if a difference occurs between the resin pressures inside the first covering portion and the second covering portion, the pressures can be transferred between the covering portions via the connecting portions. Therefore, the connecting portions have an advantageous effect of reducing the stress generated in the protruding portions. As a result, the plastic optical element 2 the birefringence of which is reduced can be provided without causing cracks to occur in the protruding portions 3 of the member.

FIGS. 1A to 1C illustrate the member 1 in the case where the external shape of the member 1, which is a lens, is a quadrangular shape with rounded corners when viewed from the direction parallel to the optical axis X. However, the member 1 according to the present invention is not limited to the above shape, and the external shape of the member 1, which is a lens, may be a quadrangular shape, an elliptical shape, a circular shape, a polygonal shape, or the like when viewed from the direction parallel to the optical axis X. The member 1 may have a lens surface covered and integrated with a plastic material. Although the case where the protruding portion 3 is formed at two positions each of which is in the vicinity of the center of one of the short sides of the member 1 has been described as an example, the position at which the protruding portion 3 is formed and the number of the protruding portions 3 are not particularly limited. In the case where the protruding portion 3 is formed at two positions, a stress applied to the protruding portion when the resin is injected into spaces for forming the covering portions is reduced as compared with the case where the protruding portion 3 is formed at only one position, and thus, occurrence of cracks may be further suppressed. For example, in the case of a quadrangular lens, the protruding portions 3 may be formed in the vicinities of the centers of the short sides of the lens, in the vicinities of the centers of the long sides of the lens, or in the vicinities of diagonal points of the quadrangle when viewed from the direction parallel to the optical axis X. The protruding portion 3 may be formed at only one position or may be formed at a plurality of positions. The protruding portions 3 may be formed on both the short and long sides of the lens. Similarly, in the case where the external shape of the member, which is a lens, is any other shape when viewed from the direction parallel to the optical axis X, the position at which the protruding portion is formed and the number of the protruding portions are not particularly limited. Although FIG. 1A illustrates an example of the protruding portion 3 of the member having a rectangular shape and protruding from the outer surface of the member when viewed from the direction parallel to the optical axis X, the shape of the protruding portion 3 may be a circular shape, a semicircular shape, a polygonal shape or the like when viewed from the direction parallel to the optical axis X.

The first embodiment of the present invention is described taking a meniscus lens as an example. However, the present invention is not limited to the above lens and may be widely applied to optical elements such as various lenses including a convex lens, a concave lens, a cylindrical lens, an fθ lens, and a Fresnel lens.

Next, an example of a method of manufacturing the plastic optical element 2 of the first embodiment will be described with reference to FIGS. 3A to 3D. The same elements as in FIGS. 1A to 1C and FIGS. 2A to 2C are denoted by the same reference numerals, and repeated descriptions thereof will be omitted. In the example of the method of manufacturing the plastic optical element 2 of the first embodiment, the member is arranged in a metal mold, and the protruding portions of the member are brought into contact with the metal mold so as to be held by the metal mold. In the member, the connecting area is formed in each of the protruding portions of the member, which are held by the metal mold, or is formed in an adjacent portion of each of the protruding portions of the member, which are held by the metal mold, and spaces are formed in the metal mold such that a covering plastic is also injected into each of the connecting areas. The spaces are parts of a cavity. The protruding portions and parts of the side surface of the member other than the connecting areas are brought into contact with the metal mold. In this state, a molten plastic is injected onto the first surface and the second surface of the member, so that the first covering portion and the second covering portion are formed on and integrated with the first surface and the second surface of the member, respectively. As a result, the plastic optical element including projecting portions that are made of the material out of which the member is made and the material out of which the covering portions are made and that are formed on parts of the side surface of the member is formed.

FIGS. 3A to 3D are sectional views of an example of a metal mold according to the first embodiment. FIGS. 3A to 3D illustrate a member injection mold 30, a cavity 31 of the member injection mold, a gate 32 of the member injection mold, a runner 33 of the member injection mold, a sprue 34 of the member injection mold, a plastic optical element injection mold 35, a gate 36 of the plastic optical element injection mold, a runner 37 of the plastic optical element injection mold, and a sprue 38 of the plastic optical element injection mold.

Figure 3A:
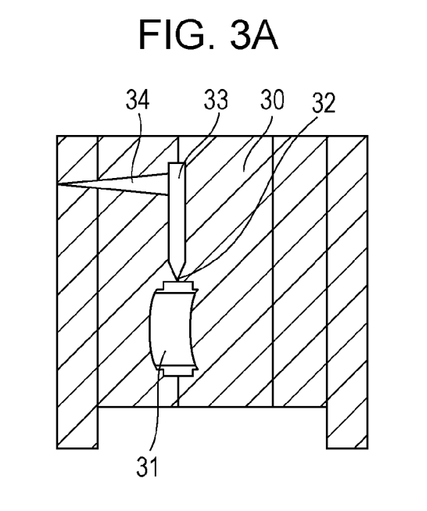
FIGS. 3A to 3D are sectional views of a metal mold according to the first embodiment and Example 1 of the present invention.

In FIG. 3A, the cavity 31 within the member injection mold 30 for forming the member 1 has a shape that forms the protruding portions 3 and the connecting areas 21 (spaces). A molten plastic that is a material out of which the member 1 is molded is injected into the cavity through the sprue 34, the runner 33, and the gate 32, so that the member 1 made of plastic in which the protruding portions 3 and the connecting areas 21 are formed can be obtained.

Figure 3B:
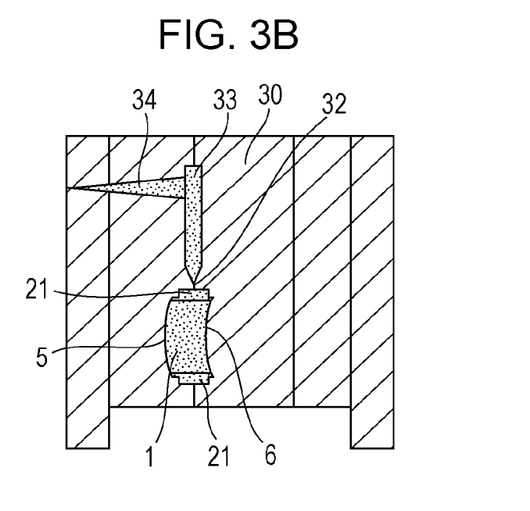
Figure 3C:
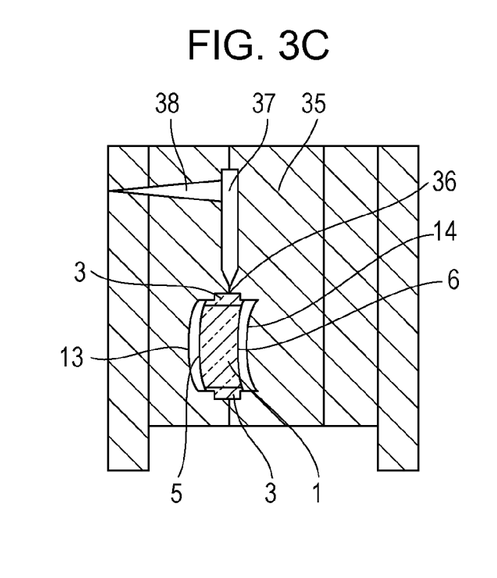

Next, the member 1 is inserted into the plastic optical element injection mold 35 illustrated in FIG. 3C. Spaces are formed so that the connecting areas become parts of the cavity in the mold 35 while the protruding portions 3 of the member are brought into contact with the mold 35 so as to be held by the mold 35. The protruding portions and the parts of the side surface of the member other than the connecting areas are brought into contact with the metal mold so that a resin will not flow onto the side surface. Then, a covering plastic 12 illustrated in FIG. 3D that is a material out of which the covering portions are molded is injected into the cavity through the sprue 38, the runner 37, and the gate 36. Although the gate may be positioned in the connecting area, the position of the gate is not limited to in the connecting area. In the case where the gate is positioned in the connecting area, the first and second covering portions may easily be connected to each other, and occurrence of cracks and the like in the protruding portions 3 may be further suppressed. As a result, the birefringence of the plastic optical element 2 may be reduced. After the cavity is filled with the covering plastic 12, the covering plastic 12 flows into the connecting areas 21 formed in the protruding portions 3 of the member or formed in the adjacent portions of the protruding portions 3 of the member so as to form connecting portions. As a result, the projecting portions made of the material out of which the member is made and the material out of which the covering portions are made are formed on parts of the side surface of the member. The first covering portion of the first surface and the second covering portion of the second surface are connected to each other through the projecting portions. However, the parts of the side surface other than the connecting portions are not connected to the covering portions, that is, no covering portion is formed on the parts of the side surface other than the connecting portions. After that, the plastic optical element 2 including the member 1 and the covering portions that are made of the covering plastic 12 and that are integrated with the member 1 can be obtained through a cooling step, a mold opening step, and an ejecting step that are not illustrated in the drawings. The first covering portion and the second covering portion are not connected to each other in the parts of the side surface of the plastic optical element 2 other than the projecting portions made of the material out of which the member is made and the material out of which the covering portions are made, and thus, the parts of the side surface of the plastic optical element 2 other than the projecting portions are exposed. With such a configuration, the plastic optical element 2 deformation of which is suppressed, the birefringence of which is reduced, and in which cracks do not occur in the projecting portions 3 of the member held by the metal mold can be obtained.

Figure 3D:
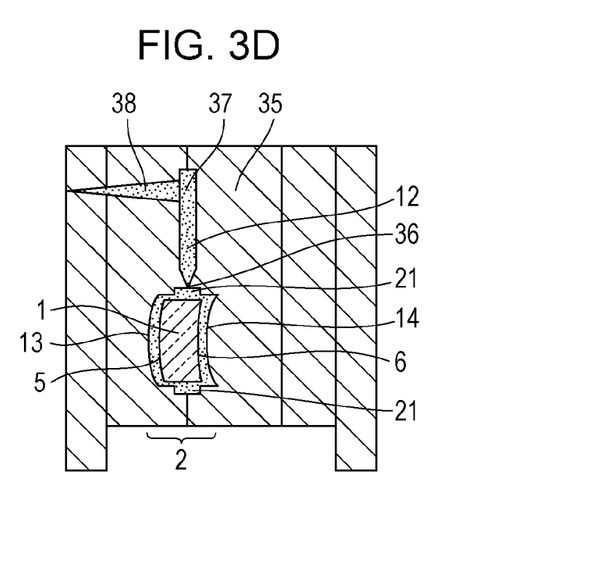

The material out of which the member 1 illustrated in FIGS. 3B to 3D is made and the material out of which the covering portions are made are not particularly limited and may be the same material or different materials as long as they are a thermoplastic. An example of the materials is a material that includes any one of a polycarbonate, a polymethylmethacrylate, a cycloolefin polymer, a copolymer of a cycloolefin and an α-olefin, a polystyrene, a copolymer of a styrene and a methyl methacrylate, a fluorene-based polyester, and the like.

The optical surface 13 and the optical surface 14 of the plastic optical element 2 are not particularly limited to the first optical surface and the second optical surface, respectively, and may be the second optical surface and the first optical surface, respectively. In addition, the shape of the optical surfaces is not particularly limited, and the optical surfaces may be spherical surfaces, aspherical surfaces, free-form surfaces, or the like. However, at least in the optically effective area 4 of the plastic optical element 2 illustrated in FIG. 2A, the shape of the first and second surfaces 5 and 6 of the member 1 and the shape of the first and second optical surfaces 13 and 14 of the plastic optical element 2 may be substantially similar to each other. In addition, at least in the optically effective area 4, the thickness 9 of the first covering portion that covers the first surface 5 of the member 1 and the thickness 10 of the second covering portion that covers the second surface 6 of the member 1 may be substantially the same. Furthermore, at least in the optically effective area 4, the thickness 11 of the member 1 may be not less than the sum of the thickness 9 of the first covering portion and the thickness 10 of the second covering portion. This configuration has an advantage in that deformation of the plastic optical element due to shrinkage of the plastic optical element after molding may be suppressed. Although it is acceptable to form the connecting areas 21 on the member 1 by machining after the member 1 is molded, it is easier to use a method of forming the connecting areas 21 at the same time as the member 1 is molded because no additional step is necessary.

Second Embodiment

A plastic optical element according to a second embodiment of the present invention will now be described below.

Figure 5A:
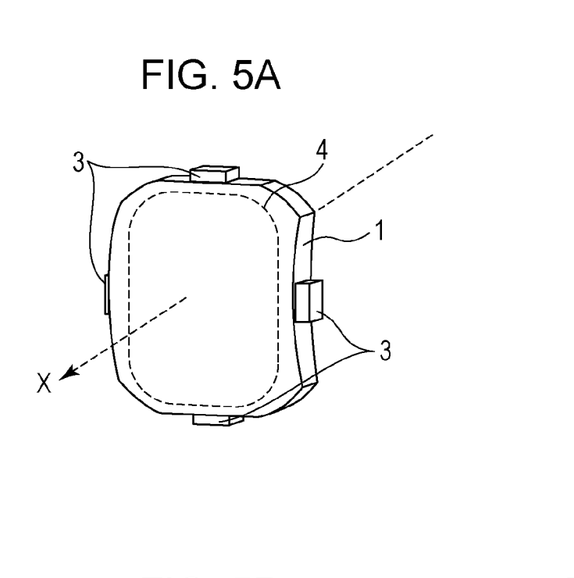
FIGS. 5A to 5C are diagrams illustrating a member according to a second embodiment and Example 2 of the present invention.
Figure 5B:
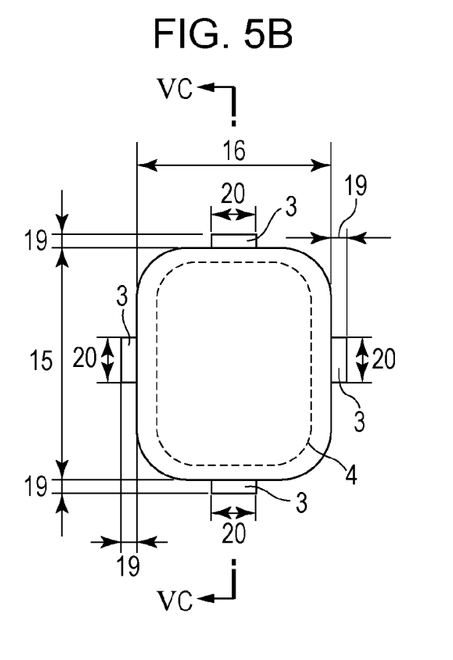
Figure 5C:
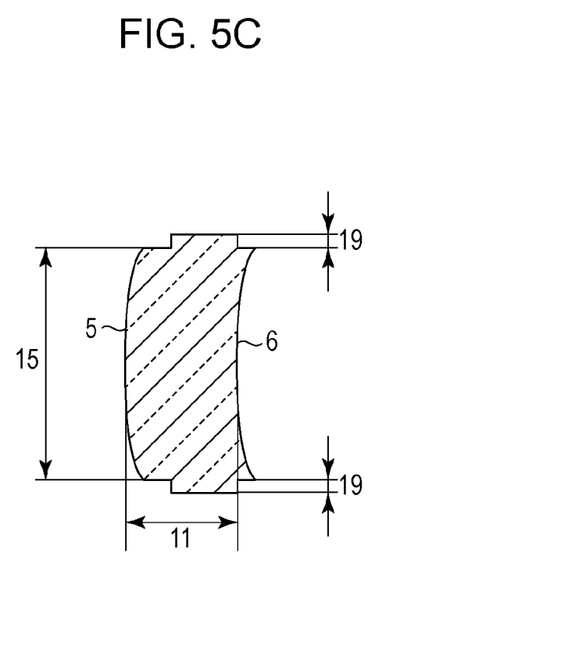
Figure 6A:
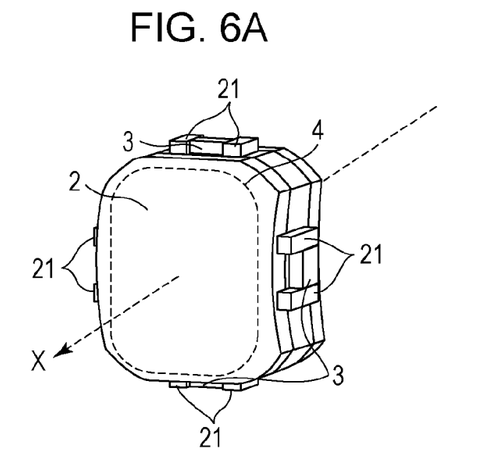
FIGS. 6A to 6C are diagrams illustrating a plastic optical element according to the second embodiment and Example 2 of the present invention.
Figure 6B:
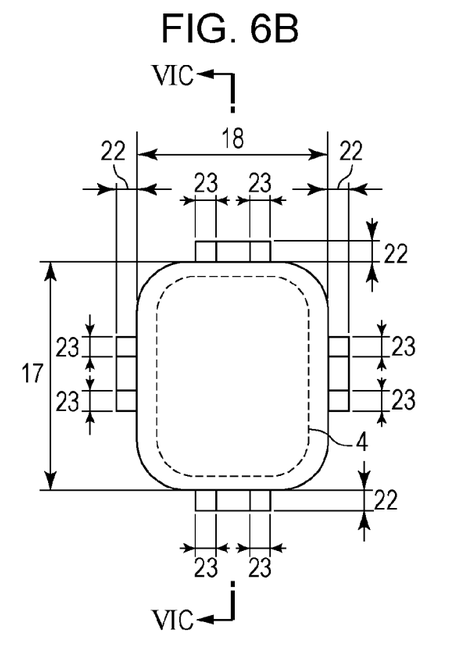
Figure 6C:
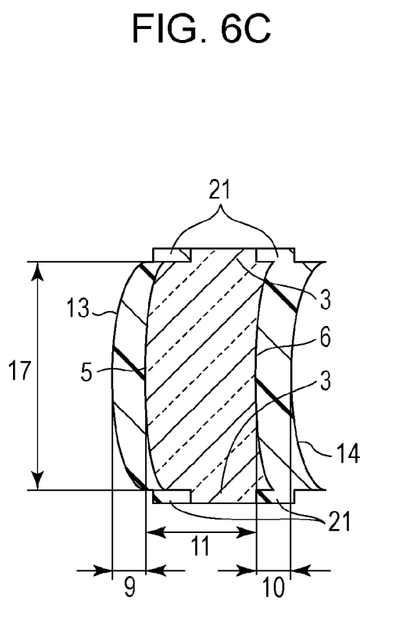

FIG. 5A, FIG. 5B, and FIG. 5C are a perspective view, a plan view, and a sectional view of a member according to the second embodiment, respectively. FIG. 6A, FIG. 6B, and FIG. 6C are a perspective view, a plan view, and a sectional view of the plastic optical element according to the second embodiment, respectively. The same elements as in FIGS. 1A to 1C and FIGS. 2A to 2C are denoted by the same reference numerals, and repeated descriptions thereof will be omitted.

FIGS. 5A to 5C illustrate the shape of a member 1. FIGS. 5A to 5C illustrate an example in which the member 1 has a quadrangular shape with rounded corners and in which a protruding portion 3 is formed at four positions that are on the outer surface of the member and that are in the center portions of the short sides and the long sides of the member. Forming the protruding portion 3 at four positions enables a stress applied to the protruding portion 3 to be further reduced, and thus, the optical characteristics of the plastic optical element may be improved.

FIGS. 6A to 6C illustrate the shape of a plastic optical element 2. The external shape of the plastic optical element 2 is the same as that of the member 1. The plastic optical element 2 is molded in a metal mold that is fabricated such that connecting areas (spaces) are formed on the outer sides of the protruding portions of the member. When the plastic optical element 2 is molded, the member is positioned such that the protruding portions and the parts of the side surface of the member other than the connecting areas are brought into contact with the metal mold so that a resin will not flow onto the side surface. With such a configuration, the plastic optical element 2 deformation of which is suppressed, the birefringence of which is reduced, and in which cracks do not occur in the projecting portions 3 of the member held by the metal mold can be obtained.

EXAMPLES

Next, Examples will be described below.

Example 1

An injection mold 30 having a cavity for molding a member was prepared. The shape of the member to be molded was the same as that illustrated in FIGS. 1A to 1C. The member was a meniscus lens having a quadrangular shape with rounded corners and having an optically effective area 4 therein. The member had a height 15 of 18 mm, a width 16 of 15 mm, and a thickness 11 of 6 mm. Protruding portions 3 were formed at positions that are on the outer surface of the member and that are in the center portions of the short sides of the member, and the protruding portions 3 had a height 19 of 1 mm and a width 20 of 6 mm. The protruding portions 3 were symmetrically positioned in the top-bottom direction of the member. A connecting area 21 in which a first covering portion and a second covering portion were to be connected to each other when a plastic optical element was molded was formed in the center of each of the protruding portions 3. Each of the connecting areas 21 had a height 22 of 1.5 mm, and a width 23 of 2 mm.

First, the member injection mold 30, which was prepared, was arranged in an injection mold apparatus. Next, a cycloolefin polymer that was a molten plastic material out of which the member was molded was injected into the cavity through a sprue, a runner, and a gate of the mold. After that, the member was manufactured through a cooling step, a mold opening step, and an ejecting step.

Next, an injection mold 35 having a cavity for molding first and second covering portions of the plastic optical element was prepared. The shape of the plastic optical element was the same as that illustrated in FIGS. 2A to 2C. The external shape of the plastic optical element was the same as that of the member, and the first covering portion and the second covering portion had a thickness 9 of 3 mm and a thickness 10 of 3 mm, respectively. The protruding portions of the member were held by the mold, and the mold was fabricated such that the connecting areas became spaces that were parts of the cavity. The protruding portions and parts of the side surface of the member other than the connecting areas were brought into contact with the mold so that a resin did not flow onto the side surface.

Then, the plastic optical element injection mold 35, which was fabricated, was arranged in the injection mold apparatus. Next, the member was arranged in the plastic optical element injection mold. At that time, it was confirmed that spaces were formed so that the connecting areas became parts of the cavity in the mold while the protruding portions of the member were held by the mold. The member was arranged such that the protruding portions and the side surface of the member other than the connecting areas were in contact with the mold. Next, a cycloolefin polymer as a molten plastic out of which the covering portions were molded was injected into the cavity sequentially through a sprue, a runner, and a gate of the mold. After the cavity was completely filled with the cycloolefin polymer, the first covering portion and the second covering portion were connected to each other in the connecting areas formed in the protruding portions of the member, thereby forming connecting portions. At that time, the parts of the side surface of the member other than the connecting portions were not connected to the covering portions. After that, the plastic optical element including the member and the covering portions that were integrated with the member was obtained through a cooling step, a mold opening step, and an ejecting step.

The birefringence of the plastic optical element, which was obtained, was reduced. Cracks did not occur in the protruding portions of the member. The birefringence was measured by using an apparatus manufactured by Oji Scientific Instruments. In the measurement method used for measuring the birefringence, the plastic optical element was disposed between two polarizing plates (a polarizer and an analyzer), and a single-wavelength light beam was radiated from the side of the polarizer onto the plastic optical element. The phase difference was determined from the angular dependence of the transmitted light intensity when the analyzer rotated 360 degrees about the axis of the light beam while the polarizer and the analyzer were maintained in a state of parallel nicols.

Although a cycloolefin polymer was used as the material of the member and the covering plastic in Example 1, the material is not particularly limited and may be any material as long as it is a resin for optical use in the practice of the present invention.

Example 2

FIGS. 5A to 5C and FIGS. 6A to 6C illustrate configurations of a member and a plastic optical element manufactured in Example 2. FIG. 5A, FIG. 5B, and FIG. 5C are a perspective view, a plan view, and a sectional view of a member according to Example 2 of the present invention, respectively. FIG. 6A, FIG. 6B, and FIG. 6C are a perspective view, a plan view, and a sectional view of a plastic optical element according to Example 2 of the present invention, respectively. The same elements as in FIGS. 1A to 1C and FIGS. 2A to 2C are denoted by the same reference numerals, and repeated descriptions thereof will be omitted.

First, an injection mold 30 having a cavity for molding the member was prepared. The shape of the member to be molded was the same as that illustrated in FIGS. 5A to 5C. The member was a meniscus lens having a quadrangular shape with rounded corners and having an optically effective area 4 therein. The member had a height 15 of 18 mm, a width 16 of 15 mm, and a thickness 11 of 6 mm. Protruding portions 3 were formed at four positions that are on the outer surface of the member and that are in the center portions of the short sides and the long sides of the member. The protruding portions had a height 19 of 1 mm and a width 20 of 3 mm. Two of the protruding portions were symmetrically positioned in the top-bottom direction of the member, and the other two of the protruding portions were symmetrically positioned in the left-right direction of the member.

Then, the member injection mold 30, which was prepared, was arranged in an injection mold apparatus. Next, a cycloolefin polymer that was a molten plastic material out of which the member was molded was injected into the cavity through a sprue, a runner, and a gate of the mold. After that, the member was manufactured through a cooling step, a mold opening step, and an ejecting step.

Next, an injection mold 35 having a cavity for molding first and second covering portions of the plastic optical element was prepared. The shape of the plastic optical element was the same as that illustrated in FIGS. 6A to 6C. The external shape of the plastic optical element 2 was the same as that of the member 1, and the first covering portion and the second covering portion had a thickness 9 of 3 mm and a thickness 10 of 3 mm, respectively. The protruding portions of the member were held by the mold, and the mold was fabricated such that connecting areas that were spaces having a height 22 of 1 mm and a width 23 of 1.5 mm were formed on outer sides of the protruding portions 3 of the member so as to be parts of the cavity. The protruding portions and parts of the side surface of the member other than the connecting areas were brought into contact with the mold so that a resin did not flow onto the side surface.

Then, the plastic optical element injection mold 35, which was fabricated, was arranged in the injection mold apparatus. Next, the member was arranged in the plastic optical element injection mold. At that time, it was confirmed that spaces were formed so that the connecting areas became parts of the cavity in the mold while the protruding portions of the member were held by the mold. Next, a cycloolefin polymer as a molten plastic out of which the covering portions were molded was injected into the cavity sequentially through a sprue, a runner, and a gate of the mold. After the cavity was completely filled with the cycloolefin polymer, the first covering portion and the second covering portion were connected to each other in the connecting areas formed on the outer sides of the protruding portions, thereby forming connecting portions. At that time, the parts of the side surface of the member other than the connecting portions were not connected to the covering portions. After that, the plastic optical element including the member and the covering portions that were integrated with the member was obtained through a cooling step, a mold opening step, and an ejecting step.

The birefringence of the plastic optical element, which was obtained, was reduced. Cracks did not occur in the protruding portions of the member. The birefringence was measured by using an apparatus manufactured by Oji Scientific Instruments. In the measurement method used for measuring the birefringence, the plastic optical element was disposed between two polarizing plates (a polarizer and an analyzer), and a single-wavelength light beam was radiated from the side of the polarizer onto the plastic optical element. The phase difference was determined from the angular dependence of the transmitted light intensity when the analyzer rotated 360 degrees about the axis of the light beam while the polarizer and the analyzer were maintained in a state of parallel nicols.

Although a cycloolefin polymer was used as the material of the member and the covering plastic in Example 2, the material is not particularly limited and may be any material as long as it is a resin for optical use in the practice of the present invention.

Comparative Example 1

Figure 7A:
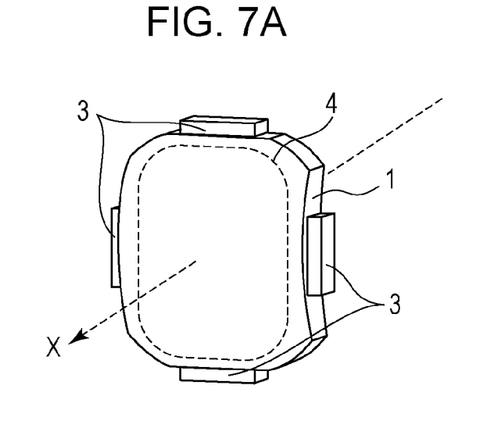
FIGS. 7A to 7C are diagrams illustrating a member according to Comparative Example 1 of the present invention.
Figure 7B:
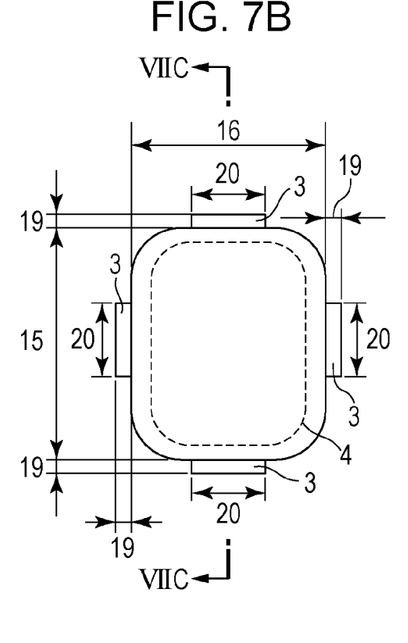
Figure 7C:
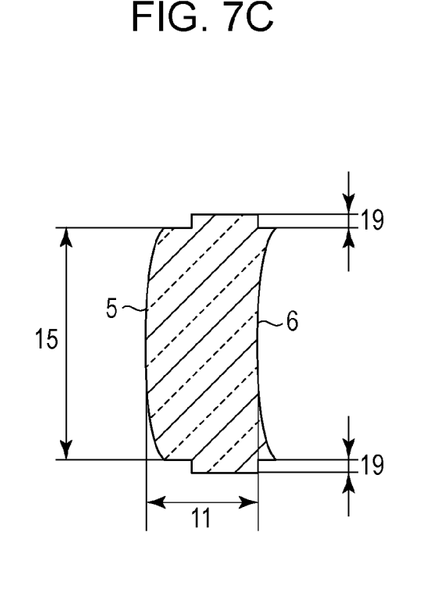
Figure 8A:
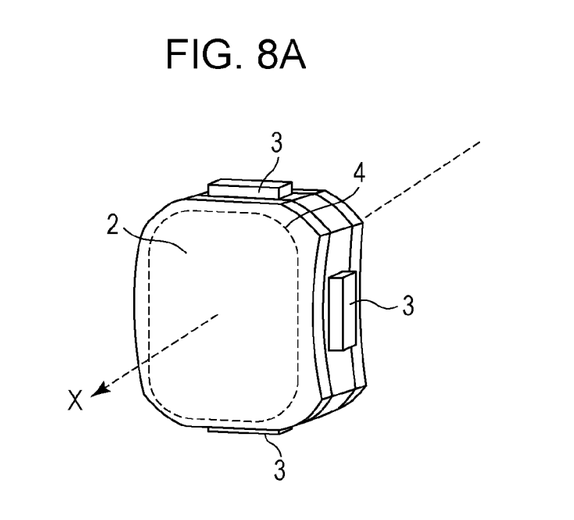
FIGS. 8A to 8C are diagrams illustrating a plastic optical element according to Comparative example 1 of the present invention.
Figure 8B:
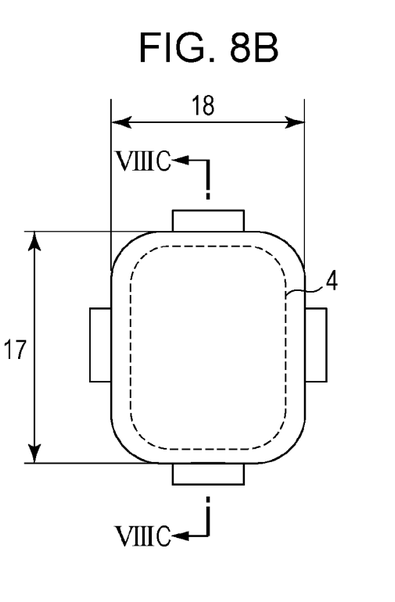
Figure 8C:
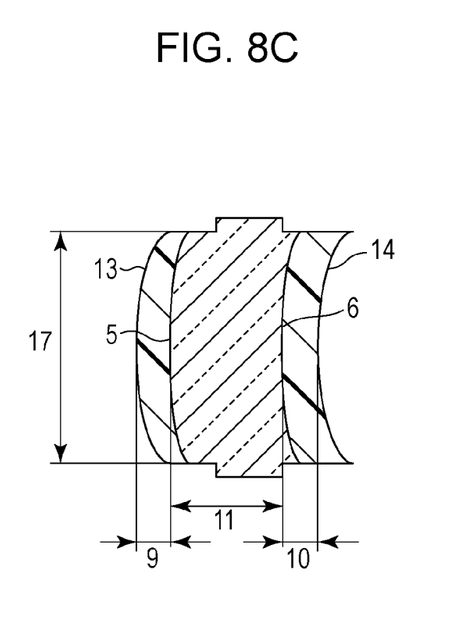

FIGS. 7A to 7C and FIGS. 8A to 8C illustrate a configuration of Comparative Example 1. FIG. 7A, FIG. 7B, and FIG. 7C are a perspective view, a plan view, and a sectional view of a member according to Comparative Example 1 of the present invention, respectively. FIG. 8A, FIG. 8B, and FIG. 8C are a perspective view, a plan view, and a sectional view of a plastic optical element according to Comparative Example 1 of the present invention, respectively. The same elements as in FIGS. 1A to 1C and FIGS. 2A to 2C are denoted by the same reference numerals, and repeated descriptions thereof will be omitted.

First, an injection mold 30 having a cavity for molding the member was prepared. The shape of the member to be molded was the same as that illustrated in FIGS. 7A to 7C. The member 1 was a meniscus lens having a quadrangular shape with rounded corners and having an optically effective area 4 therein. The member 1 had a height 15 of 18 mm, a width 16 of 15 mm, and a thickness 11 of 6 mm. The protruding portions 3 were formed at four positions on the outer surface of the member. The protruding portions had a height 19 of 1 mm and a width 20 of 6 mm. Two of the protruding portions were symmetrically positioned in the top-bottom direction of the member, and the other two of the protruding portions were symmetrically positioned in the left-right direction of the member. No connecting area was formed in the member 1.

Then, the member injection mold 30, which was prepared, was arranged in an injection mold apparatus. Next, a cycloolefin polymer that is a molten plastic material out of which the member was molded was injected into the cavity through a sprue, a runner, and a gate of the mold. After that, the member was manufactured through a cooling step, a mold opening step, and an ejecting step.

Next, an injection mold 35 having a cavity for molding first and second covering portions of the plastic optical element was prepared. The shape of the plastic optical element was the same as that illustrated in FIGS. 8A to 8C. The external shape of the plastic optical element 2 was the same as that of a member 1, and the first covering portion and the second covering portion had a thickness 9 of 3 mm and a thickness 10 of 3 mm, respectively. The protruding portions of the member were held by the mold. The mold was fabricated such that the protruding portions and the side surface of the member were brought into contact with the mold so that a resin did not flow onto the side surface.

Then, the plastic optical element injection mold 35, which was fabricated, was arranged in the injection mold apparatus. Next, the member was arranged in the plastic optical element injection mold. At that time, the protruding portions 3 of the member were held by the mold. Next, a cycloolefin polymer as a molten plastic was injected into the cavity for molding the first covering portion and the second covering portion sequentially through a sprue, a runner, and a gate of the mold. After that, the plastic optical element including the member and the first and second covering portions that were integrated with the member was obtained through a cooling step, a mold opening step, and an ejecting step.

In the plastic optical element, which was obtained, the birefringence at the periphery of the protruding portions of the member increased due to a difference between internal pressures of resins out of which the first covering portion and the second covering portion were molded, and the optical performance of the plastic optical element did not have sufficient precision. In addition, cracks occurred in the protruding portions of the member. The birefringence was measured by using an apparatus manufactured by Oji Scientific Instruments. In the measurement method used for measuring the birefringence, the plastic optical element was disposed between two polarizing plates (a polarizer and an analyzer), and a single-wavelength light beam was radiated from the side of the polarizer onto the plastic optical element. The phase difference was determined from the angular dependence of the transmitted light intensity when the analyzer rotated 360 degrees about the axis of the light beam while the polarizer and the analyzer were maintained in a state of parallel nicols.

A bending stress generated in protruding portions of a member that hold the member when covering resins are molded can be reduced, and a plastic optical element the birefringence of which is reduced and that does not have cracks therein and a method of manufacturing the plastic optical element can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-117750 filed May 23, 2012, which is hereby incorporated by reference herein in its entirety.

What is claimed is:

1. A plastic optical element comprising:
a member including a first surface, a second surface opposite the first surface, and a side surface connecting the first surface and the second surface;
a first covering portion covering the first surface;
a second covering portion made of a material which is the same as a material out of which the first covering portion is made, the second covering portion covering the second surface;
a protruding portion protruding from a part of the side surface, and made of a material which is the same as a material out of which the member is made; and
a connecting portion formed adjacent to the protruding portion on the part of the side surface, and made of a material which is the same as the material out of which the first covering portion is made, the connecting portion connecting the first covering portion and the second covering portion to each other,
wherein the protruding portion and the connecting portion are integrated with each other so as to form a projecting portion.

2. The plastic optical element according to claim 1, wherein the projecting portion is formed at two positions on the side surface of the member.

3. The plastic optical element according to claim 1, wherein the material out of which the member is made and the material out of which the first covering portion and the second covering portion are made include a same material.

4. The plastic optical element according to claim 1, wherein the material out of which the member is made and the material out of which the first covering portion and the second covering portion are made include any one of a polycarbonate, a polymethylmethacrylate, a cycloolefin polymer, a copolymer of a cycloolefin and an α-olefin, a polystyrene, a copolymer of a styrene and a methyl methacrylate, a fluorene-based polyester.

5. The plastic optical element according to claim 1, wherein the connecting portion transfers resin pressure between the first covering portion and the second covering portion when there is a difference in resin pressure of the first covering portion and resin pressure of the second covering portion.

6. A method of manufacturing a plastic optical element comprising;
arranging a member including a first surface, a second surface opposite the first surface, a side surface, and a protruding portion protruding from a part of the side surface in a mold; and
molding a covering portion on the first surface, a covering portion on the second surface, and a connecting portion adjacent to the protruding portion,
wherein a space adjacent to the first surface, the second surface, and the protruding portion is formed in the mold while the protruding portion is brought into contact with the mold so as to be held by the mold, and
wherein a plastic is injected into the spaces so that the covering portion of the first surface, the covering portion of the second surface, and the connecting portion are formed and connected to each other.

7. The method of manufacturing a plastic optical element according to claim 6,
wherein the plastic to be injected into the spaces includes any one of a polycarbonate, a polymethylmethacrylate, a cycloolefin polymer, a copolymer of a cycloolefin and an α-olefin, a polystyrene, a copolymer of a styrene and a methyl methacrylate, a fluorene-based polyester.

8. The method of manufacturing a plastic optical element according to claim 6, wherein resin pressure of the first surface and resin pressure of the second surface is transferred between the plastic connecting the covering portion of the first surface and the covering portion of the second surface when there is a difference in resin pressure.

\* \* \* \* \*